(12) United States Patent
Huang et al.

(10) Patent No.: US 9,944,267 B2
(45) Date of Patent: Apr. 17, 2018

(54) SYSTEMS AND METHODS FOR FAULT ISOLATION FOR AN ELECTRIC MOTOR ASSISTED BRAKE SYSTEM

(71) Applicant: GM Global Technology Operations LLC, Detroit, MI (US)

(72) Inventors: Xiaoyu Huang, Troy, MI (US); Youssef A. Ghoneim, Rochester, MI (US)

( * ) Notice: Subject to any disclaimer, the term of this patent is extended or adjusted under 35 U.S.C. 154(b) by 77 days.

(21) Appl. No.: 15/098,797

(22) Filed: Apr. 14, 2016

(65) Prior Publication Data
US 2017/0297549 A1 Oct. 19, 2017

(51) Int. Cl.
*B60T 17/22* (2006.01)
*B60T 13/74* (2006.01)

(52) U.S. Cl.
CPC .......... *B60T 17/221* (2013.01); *B60T 13/745* (2013.01)

(58) Field of Classification Search
CPC ...... B60T 17/22; B60T 13/745; B60T 17/221; G05B 23/0254; G07C 5/008; G07C 5/0816; G07C 5/0808
See application file for complete search history.

(56) References Cited

U.S. PATENT DOCUMENTS

| | | | |
|---|---|---|---|
| 7,117,125 B2 * | 10/2006 | Dimino | G05B 23/0229 702/185 |
| 8,634,986 B2 | 1/2014 | Ghoneim | |
| 2016/0282416 A1 * | 9/2016 | Choi | G01R 23/20 |
| 2017/0087990 A1 * | 3/2017 | Neti | B60L 3/0061 |

FOREIGN PATENT DOCUMENTS

WO WO2014/035385 A1 * 3/2014

* cited by examiner

*Primary Examiner* — Michael J Zanelli (57) ABSTRACT

A method of isolating fault in an electric motor assisted braking system of a vehicle includes calculating a value for each of a plurality of fault signature components and comparing each of the calculated values of the plurality of fault signature components to a respective threshold value for each fault signature component. The method also includes automatically executing a control action to indicate a detected fault of the electric motor assisted braking system in response to at least one of the calculated values of the plurality of fault signature components exceeding a respective threshold value.

11 Claims, 4 Drawing Sheets

| | F1 | F2 | F3 | F4 | F5 | F6 | F7 | F8 | F9 |
|---|---|---|---|---|---|---|---|---|---|
| 502 | 0 | - | - | - | +/- | +/- | X | X | X |
| 504 | X | S | X | X | X | X | X | X | X |
| 506 | - | 0 | X | X | +/- | +/- | X | X | X |
| 508 | + | + | X | 0 | +/- | 0 | X | X | X |
| 510 | - | X | X | +/- | +/- | +/- | X | X | X |
| 512 | + | + | X | +/- | 0 | +/- | X | X | X |
| 514 | - | X | X | X | X | X | X | X | X |
| 516 | X | X | X | X | X | X | S | - | 0 |
| 518 | X | X | X | X | X | X | L | L | L |

0: No Deviation
+: Positive Deviation
-: Negative Deviation
X: May Have Non-Zero Value But Not Used For Isolation
S: Small Value
L: Large Value

SYSTEMS AND METHODS FOR FAULT ISOLATION FOR AN ELECTRIC MOTOR ASSISTED BRAKE SYSTEM

TECHNICAL FIELD

The present disclosure related to control and diagnosis of vehicle brake systems.

INTRODUCTION

Brake systems may be mechanically operated having a master cylinder to generate an initial brake fluid pressure, and a vacuum booster to supplement the initial brake fluid pressure. The vacuum booster commonly receives negative pressure, or vacuum, from an internal combustion engine and uses the vacuum to generate additional pressure to fluid within a brake line to reduce the amount of pressure required to be applied by a driver.

SUMMARY

A method of isolating fault in an electric motor assisted braking system of a vehicle includes calculating a value for each of a plurality of fault signature components and comparing each of the calculated values of the plurality of fault signature components to a respective threshold value for each fault signature component. The method also includes automatically executing a control action to indicate a detected fault of the electric motor assisted braking system in response to at least one of the calculated values of the plurality of fault signature components exceeding a respective threshold value.

An electric motor assisted braking system includes a brake element to resist rotation of a wheel. The braking system also includes a hydraulic pressure system configured to a actuate the brake element, and an electric motor configured to selectively cause a pressure rise in the hydraulic pressure system based on a deceleration demand. The braking system further includes at least one controller programmed to issue a signal to operate the electric motor to actuate the brake element. The controller is also programmed to monitor data signals indicative of a plurality of fault signature components and calculate a value for each of the fault signature components. The controller is further programmed to automatically execute a control action to indicate a detected fault of the electric motor assisted braking system in response to at least one of the calculated values of the plurality of fault signature components exceeding a threshold value.

A vehicle includes a friction brake coupled to a vehicle wheel to resist rotation of the wheel and a hydraulic brake system to cause actuation of the friction brake in response to a fluid pressure rise. The vehicle also includes an electric motor to cause a pressure rise in the hydraulic system. The vehicle further includes a controller programmed to issue a signal to operate the electric motor in response to a deceleration demand. The controller is also programmed to monitor data signals indicative of a plurality of fault signature components and calculate a value for each of the fault signature components. The controller is further programmed to automatically execute a control action to indicate a detected fault of the electric-assist braking system in response to at least one of the calculated values of the plurality of fault signature components exceeding a threshold value.

A server includes at least one processor programmed to establish communication with a remote system and receive a value for each of a plurality of fault signature components from the remote system. The processor is also programmed to compare each of the values of the plurality of fault signature components to a respective threshold value for each fault signature component. The processor is further programmed to automatically execute a control action to indicate a detected fault of at least one component of the remote system in response to at least one of the calculated values of the plurality of fault signature components exceeding its respective threshold value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
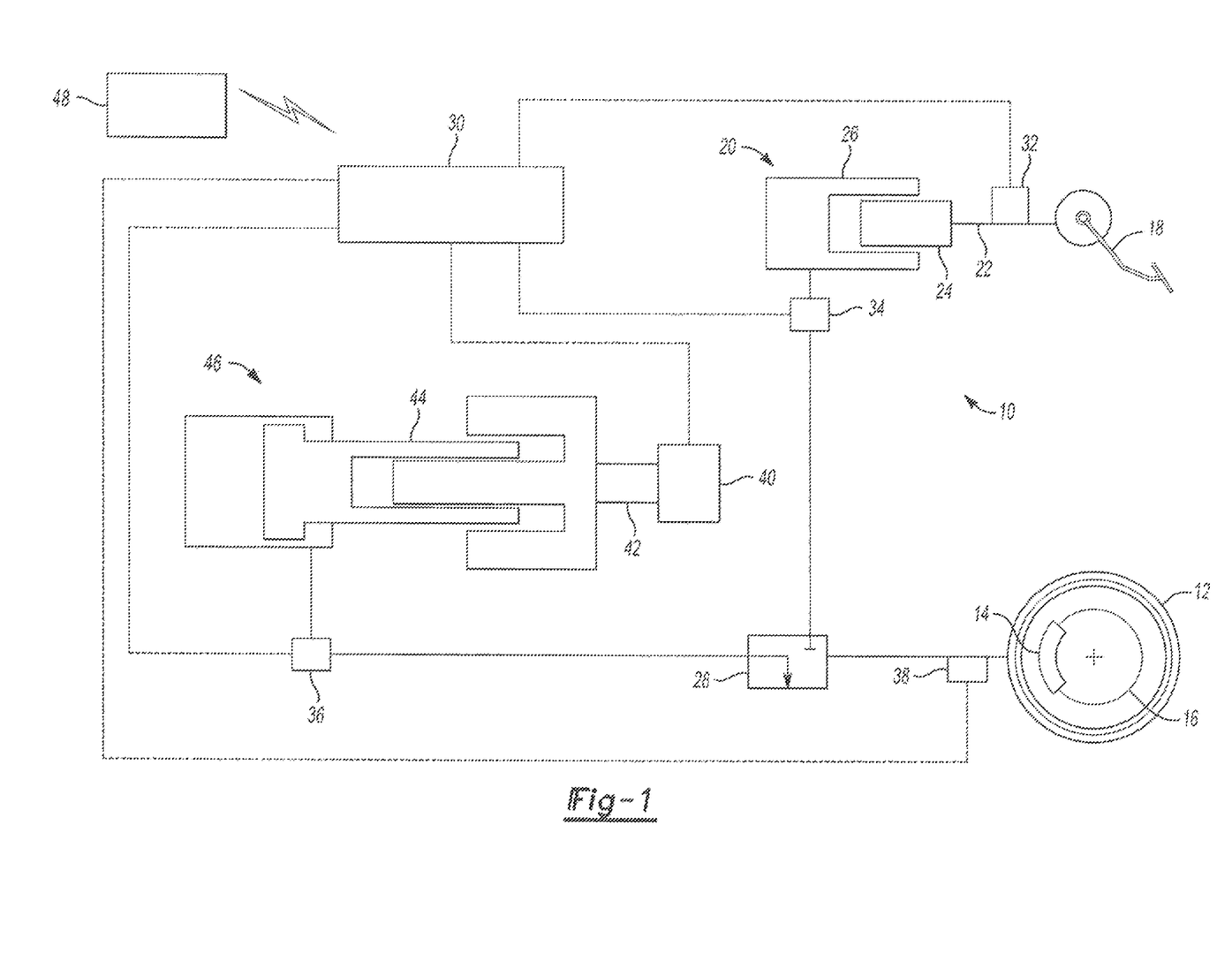
FIG. 1 is a schematic diagram of an electric motor assisted brake system.

Referring to FIG. 1 a vehicle brake system 10 applies resistive torque to at least one vehicle wheel 12 to inhibit vehicle movement. A friction brake 14 is disposed at the wheel 12 and may interface with a rotor portion 16 which rotates with the wheel 12. When deceleration is desired, pressure is applied to the friction brake 14 to press against the rotor 16 thereby resisting vehicle motion. Multiple friction brake configurations are also within the scope of the present disclosure. For example disk brakes, drum brakes and caliper style brakes each may benefit from aspects described herein.

Braking demand may be indicated by driver input at a brake pedal 18. The pedal 18 is mechanically connected to a master cylinder assembly 20 by an input rod 22. The master cylinder assembly includes a plunger 24 to compress a brake fluid within a chamber of cylinder portion 26. The chamber is in fluid flow connection with a three-way valve 28, which in turn communicates brake fluid to actuate the friction brake 14. Alternatively, braking demand may be automatically determined by an on-board or an off-board processor. In the case of a self-driving autonomous vehicle, driver input may not be required to actively control propulsion and deceleration of the vehicle. The processor may calculate the need for deceleration, then automatically cause the application of at least one friction brake to slow the vehicle.

Pressure output from the master cylinder is measured at a pressure sensor 34. Based on the desired deceleration, the brake pressure applied at the friction brake 14 is provided by an electric brake booster 46. The electric pressure booster replaces a conventional vacuum-type pressure booster to provide electrically-driven hydraulic pressure based on the brake pressure applied by a driver. In the case of an autonomous vehicle the electric brake booster may supply necessary braking pressure based on a demand determined by a computer processor.

An electric motor 40 is provided to drive the brake booster assembly. In one example, the electric motor 40 is a brushless DC motor. The electric motor 40 is configured to drive a ball screw linkage 42 which converts rotational output of the motor 40 into linear motion. The linear actuation of the ball screw linkage 42 drives a plunger assembly 44 that generates brake fluid pressure. In one example, the plunger assembly is a dual action plunger capable of regulating brake fluid pressure in multiple directions by increasing and/or decreasing pressure output to the brake line.

During a normal operation mode, the brake fluid pressure generated by the electric brake booster is passed through the three-way valve 28 to actuate the friction brake and decelerate the vehicle. Alternatively, a pair of single valves may separately regulate brake fluid pressure from each of the master cylinder 20 and the electric brake booster 46.

During a backup operation mode, brake pressure from the master cylinder assembly 20 may be used to generate brake pressure at the wheel to actuate the friction brake 14. In the case of a fault that may lead to the electric brake booster 46 being disabled, the three-way valve 28 directs pressure generated at the master cylinder to the friction brake 14.

In the case of a self-driving autonomous vehicle, the master cylinder 20 may be eliminated and the magnitude of brake fluid pressure generated by the electrical brake booster system may be determined by a controller or other computer processor. In this case the controller may determine vehicle deceleration needs based on a predetermined route or other eternal factors, and then issue a signal to control the electric motor of the electric brake booster to regulate brake line pressure.

A controller 30 is provided to monitor and control operation of the brake system 10. The controller 30 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 30 may also store a number of algorithms or computer executable instructions needed to issue commands to perform actions according to the present disclosure.

The controller is in communication with a number of sensors to receive data indicative of the performance of various vehicle components. Sensor 32 is provided near the brake pedal and may provide signals indicative of the position of brake pedal 18 and/or the pressure applied to the pedal 18 by a driver. Sensor 34 is provided near the master cylinder 20 and may provide a signal indicative of pressure output from the master cylinder into the brake line. Sensor 36 is located along the brake line and may provide a signal indicative of brake fluid pressure output from the electric motor brake booster. Sensor 38 is provided near the friction brake 14 and may provide signals indicative of wheel speed and pressure applied to the braking cylinder at wheel 12. The controller 30 is also in communication with electric motor 40 and may control current and voltage supplied to the motor, as well as receive signals indicative of torque, speed, and position of the motor. While each of the sensors is referred to in the singular, any number of sensors may be disposed at various locations to provide signals representative of the data discussed above as well as other data.

Various elements of the controller 30 may also be located off-board or outside of the vehicle, such as at a central processing location. More specifically, components and/or functions of the controller 30 may be located/performed in the vehicle 10, and other components and/or functions of the controller 30 may be located remote from the vehicle 10, with data transmitted therebetween as necessary. For example, the controller 30 may be in wireless communication with an off-board server 48 that performs at least a portion of the processing described in the present disclosure. In other examples, the controller 30 periodically uploads measured data to server 48, and server 48 performs data analysis and generates prognosis messages.

The controller 30 may also store in a memory one or more algorithms representing mathematical models of various physical aspects of brake system operation. Such mathematical models of the operation of brake system 10 may be used to predict system performance. Model-based assessments of system health may be performed using these baseline mathematical models. That is, input signals received by the controller may be recognized to exemplify certain signature system behaviors associated with component degradation or imminent failure. Common electric motor failures include for example, contamination, corrosion, improper lubrication, overheating, short circuit, vibration, and aging degradation.

In some examples parity equations are used to refine monitoring and control of the brake system. Model-based estimates of certain operating values are generated while the vehicle is operating using predetermined fixed parameters. The difference between measured outputs and the model-based estimate outputs should be close to zero under ideal conditions. In the case of a fault, the one or more process behaviors will be different from the model-based behavior since the models are structured to mimic fault-free cases. The deviations may be determined using transfer functions or using state-space formulations for example. The deviation types may be selected such that the deviation values are only influenced by particular fault types that are desired to be detected. The deviations may vary continuously related at least to fluctuations in output raw data and modeling error. To overcome the fluctuations and error, features of deviations are derived to remove noise influence as well as reduce the overall data burden. Depending on the difficulty of detecting a particular fault, the associated deviation may be calculated at a unique sample rate and/or have a unique sensitivity relative to other deviation types associated with different fault types. In some examples thresholds against which the deviations are compared may be adaptive thresholds. That is, a threshold may be automatically adjusted based on the character of the input data (e.g., rate of change of input data, direction of trend of input data, shape of change function of input data). Generally the arrangement of deviations is selected to make the deviations sensitive to faults and at the same time robust against disturbing effects.

The controller may store in memory algorithms that include mathematical models for a number of different system attributes. In one example, the model may assess electric motor attributes such as voltage and output torque. Equation (1) below characterizes aspects of dynamic behavior of electric motor voltage.

$$L\dot{I} = -RI - \Psi\omega + U \quad (1)$$

Where L is the inductance of the motor, I is the current draw at the motor, R is the motor resistance, $\Psi$ is the back EMF constant, $\omega$ is the motor output speed, and U is the motor input voltage. The controller is programmed to estimate a model-based expected system voltage as shown below in equation (2) below.

$$U_{est} = L_0 \dot{I}_m + R_0 I_m + \Psi_0 \omega_m \quad (2)$$

Where each of the values for $L_0$, $R_0$, and $\Psi_0$ are nominal known parameters for the particular motor in use. Each of $\dot{I}_m$, $I_m$, and $\omega_m$ are values that are measured during motor operation. As discussed above, the controller may also directly measure actual voltage applied to operate the motor, $U_m$. According to aspects of the present disclosure the controller may be programmed to calculate a deviation between measured voltage of an electric motor of the electric-assist braking system and an estimated voltage. The difference between the model-based motor voltage estimate $U_{est}$ and the measured voltage $U_m$ may be used as a deviation component $D_{em1}$ of a fault signature profile.

$$D_{em1} = U_m - U_{est} \quad (3)$$

Equation (4) below characterizes aspects of dynamic behavior of electric motor torque.

$$j\dot{\omega} = \Psi I - f\omega + T_t \quad (4)$$

Where J is the motor moment of inertia, $\dot{\omega}$ is a motor acceleration, f is a coefficient of friction of the motor, and $T_t$ is the load torque applied to the motor. The controller is programmed to estimate a model-based expected system torque as shown below in equation (5) below.

$$T_{t,est} = \Psi_0 I_m - f_0 \omega_m - J_0 \dot{\Psi}_m. \quad (5)$$

Where each of the values for $\Psi_0$, $f_0$, and $J_0$ are nominal known parameters for the particular motor in use. Each of $I_m$, $\omega_m$, and $\dot{\omega}_m$ are values that are measured during motor operation. As discussed above, the controller may also directly measure actual output torque of the motor, $T_{t,m}$. According to aspects of the present disclosure, the controller may be programmed to calculate a deviation between a measured output torque of the electric motor of the electric-assist braking system and an estimated output torque. The difference between the model-based motor output torque estimate $T_{t,est}$ and the measured output torque $T_{t,m}$ may be used as a deviation component $D_{em2}$ of a fault signature profile.

$$D_{em2} = T_{t,m} - T_{t,est} \quad (6)$$

The controller may be further programmed to calculate model-based estimates of motor current and speed. In some examples output data from multiple state observers are used to estimate expected outputs. A first state observer uses only one measurement of motor current, $I_m$. Based on the current draw raw data, the output data may include two portions. A first output portion may de-noise and/or filter the raw data for $I_m$ to provide a clean, averaged, and/or normalized estimate current value $I_{est,1}$. A second output portion may include a calculation of a model-based motor speed estimate $\omega_{est,1}$, for example, based on motor specifications.

A second state observer may provide related estimates of output parameters based on different inputs. For example, a second state observer uses only one measurement of motor speed $\omega_m$. Based on the motor speed raw data, the output data may include two portions. A first output portion may de-noise and/or filter the raw data for $\omega_m$ to provide a clean, averaged, and/or normalized estimate current value $\omega_{est,2}$. A second output portion of the second observer may include a calculation of a model-based motor current draw $I_{est,2}$, for example, based on motor specifications.

Additional deviation components of fault signature profiles may be derived from the outputs of each of the first and second observers described above. According to aspects of the present disclosure, the controller may be programmed to calculate a deviation between a measured current draw of the electric motor of the electric-assist braking system and an estimated current draw. The difference between the model-based current draw estimates $I_{est,1}$, $I_{est,2}$ and the measured current draw $I_m$ may be used as deviation components $D_{em3}$ and $D_{em4}$, respectively of a fault signature profile.

$$D_{em3} = I_m - I_{est,1} \quad (7)$$

$$D_{em4} = I_m - I_{est,2} \quad (8)$$

According to further aspects of the present disclosure, the controller may be programmed to calculate a deviation between a measured output speed of the electric motor of the electric-assist braking system and an estimated motor output speed. The difference between the model-based speed estimates $\omega_{est,1}$, $\omega_{est,2}$ and the measured raw motor-speed $\omega_m$ may be used as deviation components $D_{em5}$ and $D_{em6}$, respectively of a fault signature profile.

$$D_{em5} = \omega_m - \omega_{est,1} \quad (9)$$

$$D_{em6} = \omega_m - \omega_{est,2} \quad (10)$$

Each of the components $D_{em1}$, $D_{em2}$, $D_{em3}$, $D_{em4}$, $D_{em5}$, and $D_{em6}$ pertain to aspects of the performance of the electrical motor. Certain combinations of trends across the various component values may indicate faults such as degradation and/or imminent failure of components of the electric boost portions of the brake system.

Figure 2:
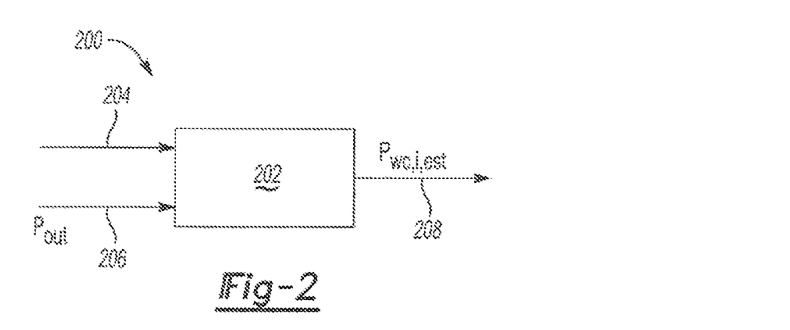
FIG. 2 is a system diagram of a model of hydraulic portions of an electric motor assisted brake system.

Additional models may also be used to calculate values for other components of fault signatures which may indicate health of other components of the brake system. Referring to FIG. 2, diagram 200 depicts inputs to, and outputs of, a model 202 of the hydraulic components of the brake system. Input 204 represents a control signal representing whether certain valves within the hydraulic system are open or closed. Input 206 represents the output pressure $P_{out}$ of an upstream sub-system such as the master cylinder for example. The hydraulic model 202 may comprise an active algorithm such that the controller utilizes a number of inputs to calculate an estimate 208 of pressure at each wheel brake piston $P_{wc,i,est}$. The indicator i may represent any of the individual vehicles wheels (e.g. LF, RF, LR, RR). Alternatively, the controller may store in a memory a lookup table such that for various system valve positions and output pressures $P_{out}$, estimate values for $P_{wc,i,est}$ may be quickly retrieve using relatively little computer processing. Such a lookup table may be predetermined, for example during calibration of a nominally performing healthy brake system. In further alternatives, the controller may communicate certain model input values to an off-board processor such as an external diagnostic server. The off-board processor may perform data-heavy processing and transmit residual values and/or state of health results back to the vehicle controller. As discussed above, the controller may be in communication with a sensor to directly measure pressure $P_{wc,i,m}$ applied to the brake piston at each given vehicle wheel. According to aspects of the present disclosure the controller may be programmed to calculate a deviation between a measured pressure of a friction brake at a vehicle wheel and a model-based estimated pressure of the brake. The difference between the model-based pressure estimate $P_{wc,i,est}$ and a measured wheel $P_{wc,i,m}$ may be used as a deviation component $D_{7,i}$, which may be calculated separately for each wheel.

$$D_{7,i} = P_{wc,i,m} - P_{wc,i,est} \quad (11)$$

Figure 3:
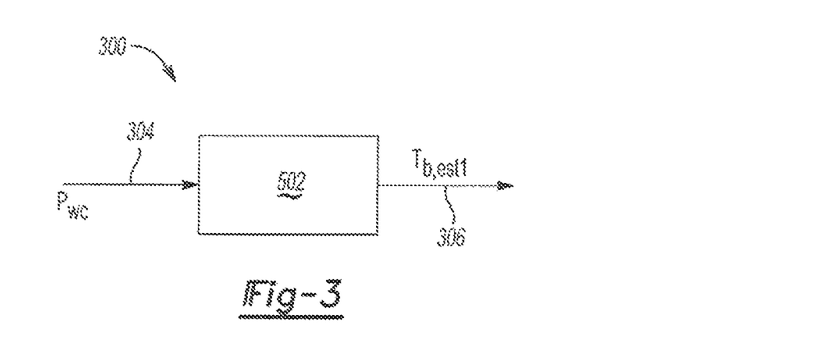
FIG. 3 is a system diagram of a first model for estimating resistive brake torque.
Figure 4:
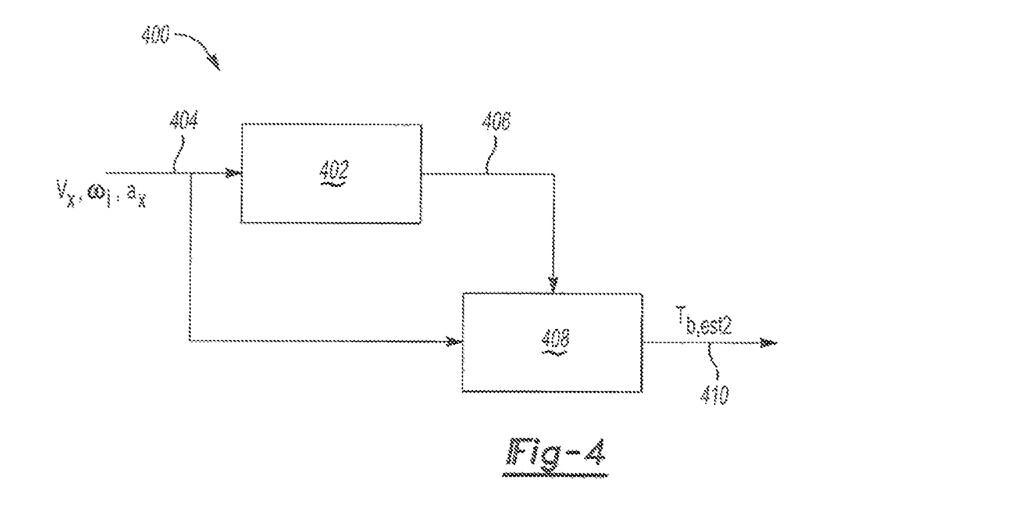
FIG. 4 is a system diagram of a second model for estimating resistive brake torque.

In further examples, the controller may compare values from two different model-based estimates as a way to derive components of a fault signature profile instead of comparing estimates to measured values. Referring collectively to FIG. 3 and FIG. 4, two different models may be used to calculate resistive torque at the friction brake. FIG. 3 includes system diagram 300 for determining friction brake torque based on an upper-level foundation brake model. Model 302 includes as an input the measured pressure at the friction brake piston, as well as physical properties for the rotor of the wheel and brake pad. Input 304 includes the measured pressure at the wheel caliper $P_{wc}$, and output 306 represents a first estimate of brake torque $T_{b,est1}$.

Referring to FIG. 4, a system diagram 400 depicts a model for determining brake torque based on a lower-level tire and wheel dynamics model. The model includes a first component 402 representing tire physical properties. Based on input 404 that includes vehicle velocity $V_x$, wheel rotation speed $\omega_i$, and vehicle acceleration $a_x$, the model provides output 406 representing an estimated longitudinal tire force $F_{x,est}$. The model also includes a second portion 408 representing an inverse wheel dynamics model. Based on inputs $V_x$, $\omega_i$, $a_x$, and as well as $F_{x,est}$, the second portion 408 provides a second estimate of brake torque $T_{b,est2}$. According to aspects of the present disclosure the controller may be programmed to calculate a deviation between a first model-based estimate of a brake torque and a second model-based estimate of brake torque. The difference between the two different model-based torques may be used as a deviation component $D_{8,i}$, which may be calculated separately for each wheel.

$$D_{8,i} = T_{b,est1} - T_{b,est2} \quad (12)$$

The controller is programmed to classify faults based on the mathematical behavior of the deviation values. For example the controller may consider different attributes of the trends of the deviation values such as a time dependency of the change in residual values (e.g., whether the trend is abrupt, incipient or intermittent). The controller may also take into account the type of change of a deviation value (e.g., overall magnitude and/or whether the deviation is additive or multiplicative). The controller may further consider the particular source of the deviation value (i.e., which component causes a change in deviation—controller, actuator, sensor, processor, etc.). In some examples, the type of control response or control action varies depending on the particular behavior of the relevant deviation values.

Figure 5:
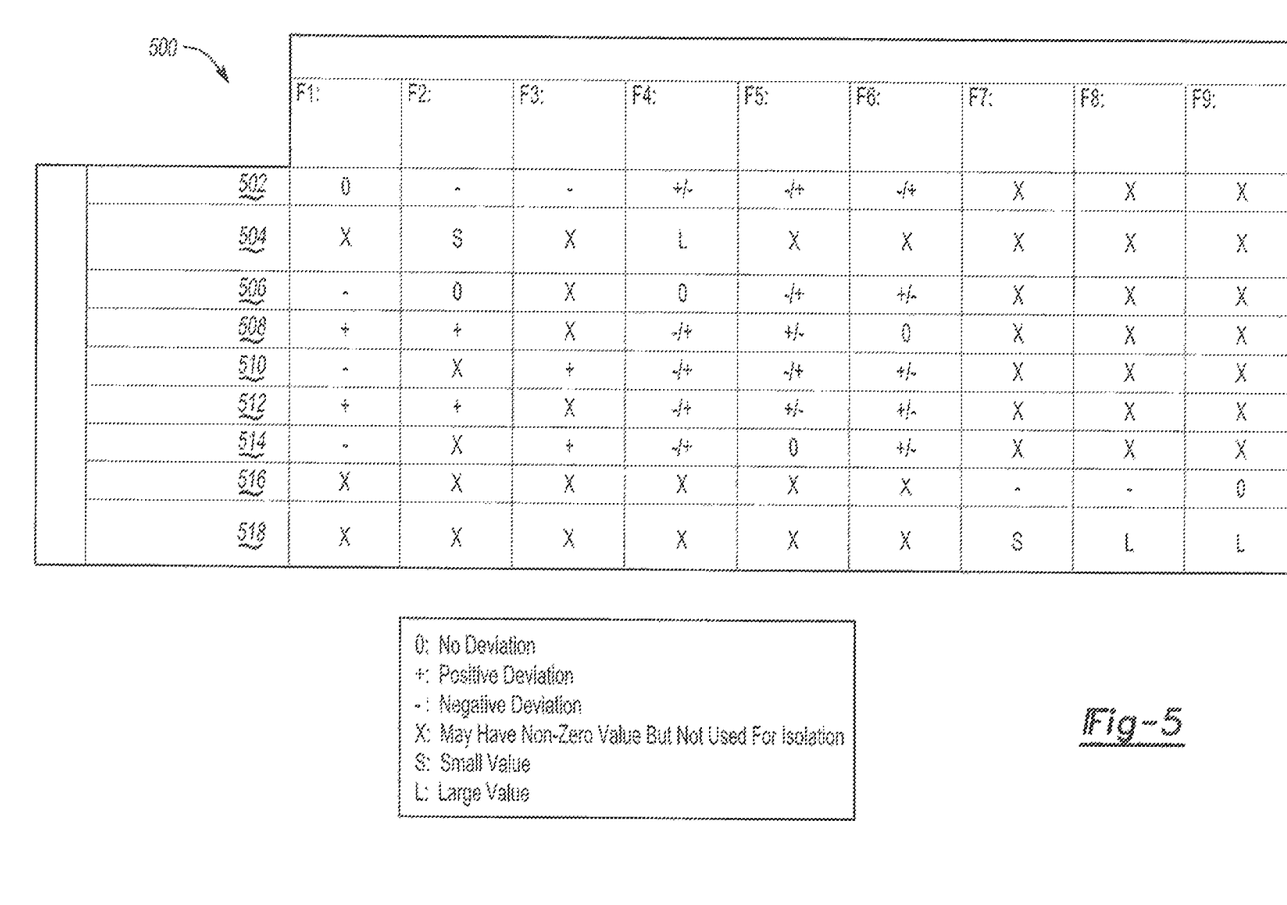
FIG. 5 is an electric motor assisted brake system fault isolation table.

Referring to FIG. 5, table 500 represents a "reasoner" algorithm which analyzes combinations of symptom features to isolate particular faults. The fault table associates each of a plurality of combinations of fault signature components with a predetermined fault type. Across the horizontal axis are predetermined fault signatures F1 through F9, where each represents a symptom set associated with a particular fault type. Each of the fault types may or may not include outright component failures, but each fault signature is based on symptoms of degraded performance of one or more system components. Each fault signature includes a unique combination of feature trends which is capable of indicating component degradation prior to a performance reduction being perceived by a driver. While nine different faults are provided by way of example, any number of faults may be predetermined and associated with a particular fault signature.

Data for each of the calculated deviations may be gathered on an ongoing basis during a vehicle drive cycle. In order to reduce the volume of data gathered and analyzed, features of the raw data may be derived which are representative of attribute behavior over a period of time. The controller may apply mathematic transformations to reduce the amount of data stored and processed. Referring to row 502 a mean value of $D_{em1}$ is calculated over a predetermined time interval. In some examples, the mean may be a rolling mean which provides an average value over an interval of about the previous one second time duration. In other examples a longer time duration may be used to generate feature values, such as over a drive cycle. Using features of the deviations instead of raw data values may provide an advantage to reduce the volume and required speed of data processing. Row 504 reflects a feature component that is a ratio of the absolute value of the mean of $D_{em1}$ to a variance of the value of $D_{em1}$ over the same time duration. Row 506 through row 514 represents mean values of electric motor property deviations $D_{em2}$ through $D_{em6}$, respectively. Row 516 represents a mean value of deviation of wheel brake pressure $D_{7,i}$ over a predetermined time period. Row 518 represents a feature component that is a ratio of the absolute value of the mean of $D_{8,i}$ to a variance of the value of $D_{8,i}$ over the same time duration.

Depending on the behavior of the values of each of the features, certain trend combinations may relate to fault signatures corresponding to a particular failure mode. The unique signatures associated with faults F1 through F9 allows the controller to isolate particular component faults on a proactive basis prior to the fault being perceived by a driver. Features designated by "0" may have substantially no deviation. Features designated by "+" may have a positive value, and features designated by "−" may have a negative value. Features designated by "S" may have a relative small value (e.g., less than a predetermined threshold), and features designated by "L" may have a relatively large value (e.g., greater than a predetermined threshold). In some examples, a given fault signature may disregard certain features as not related to the particular fault at issue. Features designated by "X" for a given fault signature indicate that the feature may have a non-zero value, but is not used for isolation of the given fault.

Figure 6:
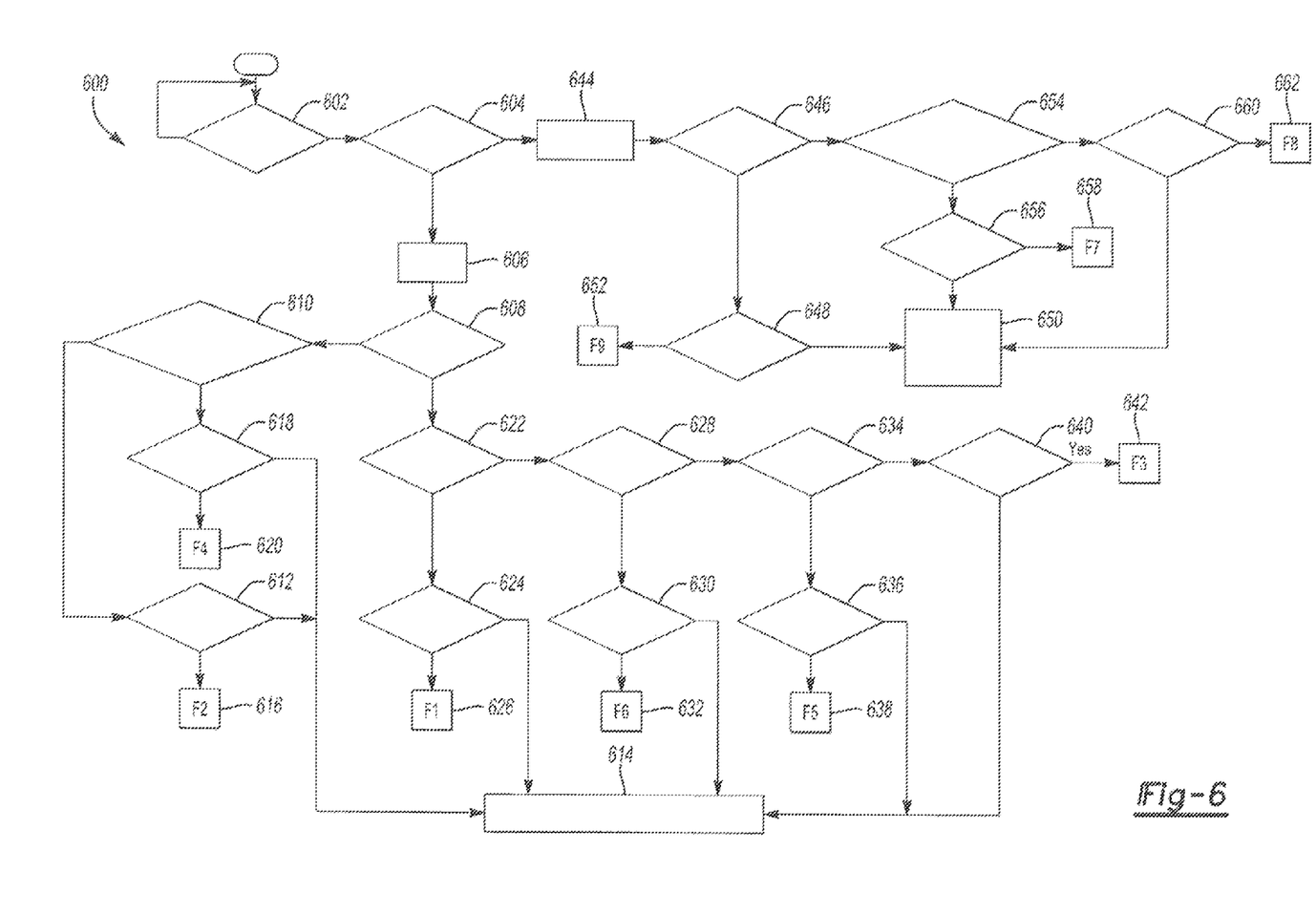
FIG. 6 is flowchart of a method of fault isolation for an electric-assist brake system.

Referring to FIG. 6 a method 600 may be used to perform fault isolation of an electric-assist brake system. The fault signature examples of method 600 correspond to the table depicted in FIG. 5. As discussed above, at least one of an on-board processor and an off-board remote server store instructions needed to execute method 600. While nine fault signatures are provided by way of example, it should be appreciated that any number of attribute features and/or fault signatures may be predetermined and subsequently used to perform fault isolation.

At step 602 the controller determines whether a feature deviation has been detected. A number of attribute features may be tracked during operation of the vehicle and monitored for changes. If no deviation is detected at step 602, the controller may return to the beginning of the method and monitor for changes in any of the tracked features.

If a deviation is detected at step 602, the controller makes a determination at step 604 regarding the type of deviation detected. If at step 604 the deviation is from the group of deviations pertaining to the electric assist motor $D_{em,i}$ (i.e., $D_{em1}$ through $D_{em6}$), the controller enters the electric motor fault portion of the isolation algorithm at step 606.

At step 608 the controller assesses the absolute value of the mean of deviation $D_{em2}$ (i.e., $|mean(D_{em2})|$) which pertains to motor torque. If at step 608 the absolute value of the mean of $D_{em2}$ is not greater than a second predetermined threshold (i.e., $|mean(D_{em2})| \not> \epsilon_2$), the possible fault signatures available based on this condition may be narrowed down as part of the isolation process. In this case, fault signatures F2 and F4 remain possible causes when the motor torque is within a predetermined nominal range.

At step 610 the controller assesses the ratio of the absolute value of the mean of $D_{em1}$ to a variance of the value of $D_{em1}$ (i.e., $|mean(D_{em1})|/var(D_{em1})$). If the ratio is not greater than a ratio threshold $Th_1$ for a predetermined duration of time y (i.e., $|mean(D_{em1})|/var(D_{em1}) \not> Th_1$ for time y), additional fault signatures may be eliminated such that only fault signature F2 remains possible.

At step 612 the controller performs a confirmatory check of the other features to ensure a complete match with the predetermined fault signature F2. If at step 612 there is a mismatch of at least one calculated feature, the detected deviations may correspond to a fault of the electric motor subsystem that is not predefined as part of the isolation algorithm. At step 614 the controller may determine that the detected deviation conditions correspond to an unidentified fault signature. If at step 612 all of the calculated features match the signature corresponding to F2, the controller may determine at step 616 that a fault exists related to an increase in motor armature resistance. Such a resistance fault may be further associated with an overloaded or overheated motor stator.

If at step 610 the ratio is greater than a ratio threshold $Th_1$ for predetermined duration of time y (i.e., $|mean(D_{em1})|/var(D_{em1})>Th_1$ for time y), additional fault signatures may be eliminated such that only fault signature F4 remains possible. At step 618 the controller assesses the remaining feature values to confirm whether there is a complete match to the fault signature F4. If at step 618 there is a mismatch of at least one calculated feature, the detected deviations may correspond to a fault of the electric motor subsystem that is not predefined as part of the isolation algorithm. At step 614 the controller may determine that the detected deviation conditions correspond to an unidentified fault signature. If at step 618 all of the calculated features match the signature corresponding to F4, the controller may determine at step 620 that a fault exists related to bias or drift of the voltage read from the electric motor. Such a fault may be further associated with an aging voltage sensor.

If at step 608 the absolute value of the mean of $D_{em2}$ is greater than the second predetermined threshold (i.e., $|mean(D_{em2})| > \epsilon_2$), the possible fault signatures available based on this condition may be narrowed down as part of the isolation process. In this case, fault signatures F1, F3, F5, and F6 remain possible causes when the motor torque is outside of the predetermined nominal range.

At step 622, the controller assesses the absolute value of the mean of deviation $D_{em1}$ which relates to motor operating voltage. If the value is not greater than a first predetermined threshold (i.e., $|mean(D_{em1})| \not> \epsilon_1$), certain fault signatures may be eliminated such that only F1 remains possible. At step 624 the controller assesses the remaining feature values to confirm whether there is a complete match to the fault signature F1. If at step 624 there is a mismatch of at least one calculated feature, the detected deviations may correspond to a fault of the electric motor subsystem that is not predefined as part of the isolation algorithm. At step 614 the controller may determine that the detected deviation conditions correspond to an unidentified fault signature. If at step 624 all of the calculated features match the signature corresponding to F1, the controller may determine at step 626 that a fault exists related to undue friction of the electric motor. Such a fault may be further associated with a worn or broken motor bearing.

If at step 622 the absolute value of the mean of deviation $D_{em1}$ is greater than the first predetermined threshold (i.e., $|mean(D_{em1})| > \epsilon_1$), certain fault signatures may be eliminated such that only the fault signatures corresponding to F3, F5 and F6 remain available.

At step 628 the controller assesses the absolute value of the mean of deviation $D_{em3}$ which relates to motor operating current. If the absolute value is not greater than a third predetermined threshold $\epsilon_2$ (i.e., $|mean(D_{em3})| \not> \epsilon_3$), certain fault signatures may be eliminated such that only the fault signature corresponding to F6 remains available. At step 630 the controller assesses the remaining feature values to confirm whether there is a complete match to the fault signature F6. If at step 630 there is a mismatch of at least one calculated feature, the detected deviations may correspond to a fault of the electric motor subsystem that is not predefined as part of the isolation algorithm. At step 614 the controller may determine that the detected deviation conditions correspond to an unidentified fault signature. If at step 630 all of the calculated features match the signature corresponding to F6, the controller may determine at step 632 that a fault exists related to bias or drift of the sensed output speed of the electric motor. Such a fault may be further associated with an aging speed sensor.

If at step 628 the value of the absolute value of the mean of $D_{em3}$, is greater than the third predetermined threshold (i.e., $|mean(D_{em3})| > \epsilon_3$), certain fault signatures may be eliminated such that only the fault signatures corresponding to F3 and F5 remain available.

At step 634 the controller assess the absolute value of the mean of deviation $D_{em6}$ which relates to motor output speed. If the absolute value is not greater than a sixth predetermined threshold $\epsilon_6$ (i.e., $|mean(D_{em6})| \not> \epsilon_6$), certain fault signatures may be eliminated such that only the fault signature corresponding to F5 remains available. At step 636 the controller assesses the remaining feature values to confirm whether there is a complete match to the fault signature F5. If at step 636 there is a mismatch of at least one calculated feature, the detected deviations may correspond to a fault of the electric motor subsystem that is not predefined as part of the isolation algorithm. At step 614 the controller may determine that the detected deviation conditions correspond to an unidentified fault signature. If a step 636 all of the calculated features match the signature corresponding to F5, the controller may determine at step 638 that a fault exists related to bias or drift of the sensed current of the electric motor. Such a fault may be further associated with an aging current sensor.

If at step 634 the value of the absolute value of the mean of $D_{em6}$, is greater than the sixth predetermined threshold (i.e., $|mean(D_{em6})|>\epsilon_6$), certain fault signatures may be eliminated such that only the fault signature corresponding to F3 remains available. At step 640 the controller assesses the remaining feature values to confirm whether there is a complete match to the fault signature F3. If at step 640 there is a mismatch of at least one calculated feature, the detected deviations may correspond to a fault of the electric motor subsystem that is not predefined as part of the isolation algorithm. At step 614 the controller may determine that the detected deviation conditions correspond to an unidentified fault signature. If at step 640 all of the calculated features match the signature corresponding to F3, the controller may determine at step 642 that a fault exists related to a decrease in the back EMF of the electric motor. Such a fault may be further associated with a magnet of the motor becoming at least partially demagnetized.

If at step 604 the deviation detected is not from the group of deviations pertaining to the electric assist motor $D_{em,i}$ (i.e., $D_{em1}$ through $D_{em6}$), the controller enters the hydraulic brake fault portion of the isolation algorithm at step 644.

At step 646 the controller assesses absolute value of the mean of deviation $D_{7,i}$ which relates to pressure applied by the brake piston at each wheel to decelerate the vehicle. The value of $D_{7,i}$ may be calculated for each vehicle wheel. If the absolute value is not greater than a seventh predetermined threshold $\epsilon_7$ (i.e., $|mean(D_{7,i})|\not>\epsilon_7$), certain fault signatures may be eliminated such that only the fault signature corresponding to F9 remains available. At step 648 the controller assesses the remaining feature values to confirm whether there is a complete match to the fault signature F9. If at step 648 there is a mismatch of at least one calculated feature, the detected deviations may correspond to a fault of the hydraulic brake subsystem that is not predefined as part of the isolation algorithm. At step 650 the controller may determine that the detected deviation conditions correspond to an unidentified fault signature. If at step 648 all of the calculated features match the signature corresponding to F9, the controller may determine at step 652 that a fault exists related to a decrease in a torque coefficient. Such a fault may be further associated with a worn or corroded components of the brake and rotor combination.

If at step 646 the value of the absolute value of the mean of deviation $D_{7,i}$, is greater than the third predetermined threshold (i.e., $|mean(D_{7,i})|>\epsilon_7$), certain fault signatures may be eliminated such that only the fault signatures corresponding to F7 and F8 remain available.

At step 654 the controller assesses the ratio of the absolute value of the mean of $D_{8,i}$ to a maximum absolute value of $D_{8,i}$ (i.e., $|mean(D_{8,i})|/max|D_{8,i}|$). If the ratio is not greater than a ratio threshold $Th_2$ for a predetermined duration of time y (i.e., $|mean(D_{8,i})|/max|D_{8,i}|\not> Th_2$ for time y), additional fault signatures may be eliminated such that only fault signature F7 remains possible. At step 656 the controller performs a confirmatory check of the other features to ensure a complete match with the predetermined fault signature F7. If at step 656 there is a mismatch of at least one calculated feature, the detected deviations may correspond to a fault of the hydraulic brake subsystem that is not predefined as part of the isolation algorithm. At step 650 the controller may determine that the detected deviation conditions correspond to an unidentified fault signature. If at step 656 all of the calculated features match the signature corresponding to F7, the controller may determine at step 658 that a fault exists related to a deviation of the effective bulk modulus of the brake fluid. Such a fault may be further associated with contaminants within the brake fluid line, for example, such as air bubbles, water, or other debris.

If at step 654 the ratio is greater than a ratio threshold $Th_2$ for a predetermined duration of time y (i.e., $|mean(D_{8,i})|/max|D_{8,i}|>Th_2$ for time y), additional fault signatures may be eliminated such that only fault signature F8 remains possible. At step 660 the controller assesses the remaining feature values to confirm whether there is a complete match to the fault signature F8. If at step 660 there is a mismatch of at least one calculated feature, the detected deviations may correspond to a fault of the hydraulic brake subsystem that is not predefined as part of the isolation algorithm. At step 650 the controller may determine that the detected deviation conditions correspond to an unidentified fault signature. If at step 660 all of the calculated features match the signature corresponding to F8, the controller may determine at step 662 that a fault exists related error in the flow rate of the brake fluid during actuation. Such a fault may be further associated with a fluid leak in the brake system.

While a number of failure mode types and feature types are provided herein by way of example, it is contemplated that any of number of failure mode types may be isolated using fault signatures corresponding to related features.

In response to identifying any of a number of fault cases based on a signature profile, the controller may execute a control action to indicate a detected fault of the electric-assist braking system. For example, the controller may cause the transmission of a prognosis message in response to detecting a fault condition. Once a particular fault signature is identified, the controller may tailor a unique response depending on the fault type, severity, and imminence of a full failure. The controller may cause recording of a diagnostic code. The controller may issue an in-vehicle warning message to notify a driver. The controller may also transmit a prognosis message to a remote processor such as a mobile device or an off-board computer processor. In some examples, a multi-tiered prognosis message group may include a general warning level to bring attention to the state of health of a degraded brake system component. The multi-tiered prognosis message group may also include an urgent warning level to inform the driver and/or service provider of an imminent component failure.

The processes, methods, or algorithms disclosed herein can be deliverable to, and/or implemented by a processing device, controller, or computer, which can include any existing programmable electronic control unit or dedicated electronic control unit. Similarly, the processes, methods, or algorithms can be stored as data and instructions executable by a controller or computer in many forms including but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiment described as less desirable than other embodiments or prior art implementations with respect to one or more characteristics are not outside the scope of the disclosure and can be desirable for particular applications.

What is claimed is:

1. An electric motor assisted braking system comprising:
   a brake element to resist rotation of a wheel;
   a hydraulic pressure system configured to actuate the brake element;
   an electric motor configured to cause a pressure rise in the hydraulic pressure system based on a deceleration demand; and
   at least one controller programmed to
      issue a signal to operate the electric motor to cause braking,
      monitor data signals indicative of a plurality of fault signature components,
      calculate an assessment value for each of the fault signature components, and
      in response to at least one of the calculated values of the plurality of fault signature components exceeding a threshold value, execute a control action to indicate a detected fault of the electric motor assisted braking system.

2. The electric motor assisted braking system of claim 1 wherein the plurality of fault signature components includes at least one of:
   a deviation between a measured voltage of the electric motor and an estimated voltage,
   a deviation between a measured current of the electric motor and an estimated current,
   a deviation between a measured output torque of the electric motor and an estimated output torque,
   a deviation between a measured output speed of the electric motor and an estimated output speed,
   a deviation between a measured pressure of a friction brake at a vehicle wheel and an estimated pressure of the brake, and
   a deviation between a first estimated brake torque at a vehicle wheel and a second estimated brake torque.

3. The electric motor assisted braking system of claim 1 wherein the at least one of the plurality of fault signature components includes deviation between a first model-based estimate and a second model-based estimate.

4. The electric motor assisted braking system of claim 1 wherein the controller is further programmed to store in a memory a fault table associating each of a plurality of combinations of fault signature components with a predetermined fault type.

5. The electric motor assisted braking system of claim 1 wherein the controller is further programmed to upload at least a portion of data indicative of the assessment values to an off-board processor.

6. The electric motor assisted braking system of claim 1 wherein the control action includes issuing a prognosis message indicative of at least one predetermined fault type based on a detected combination of fault signature components.

7. A vehicle comprising:
   a friction brake coupled to a vehicle wheel to resist rotation of the wheel;
   a hydraulic system to cause actuation of the friction brake in response to a fluid pressure rise;
   an electric motor to cause a pressure rise in the hydraulic system; and
   a controller programmed to
      in response to a deceleration demand, issue a signal to operate the electric motor,
      monitor data signals indicative of a plurality of fault signature components,
      calculate a value for each of the fault signature components, and
      in response to at least one of the calculated values of the plurality of fault signature components exceeding a threshold value, execute a control action to indicate a predetermined detected fault.

8. The vehicle of claim 7 wherein the deceleration demand is based on a driver input received at a brake pedal.

9. The vehicle of claim 7 wherein the deceleration demand is determined by at least one of an on-board processor and an off-board processor.

10. The vehicle of claim 7 wherein executing the control action includes at least one of: storing a diagnostic code, issuing an in-vehicle warning message, and transmitting a prognosis message to a remote processor.

11. The vehicle of claim 7 wherein the controller is further programmed to associate a combination of fault signature components with a predetermined fault type.

* * * * *